US008364161B2

(12) United States Patent
Nitta et al.

(10) Patent No.: US 8,364,161 B2
(45) Date of Patent: Jan. 29, 2013

(54) WIRELESS COMMUNICATION SYSTEM AND METHOD OF ASSIGNING WIRELESS RESOURCES IN THE SAME SYSTEM AND CONTROLLER

(75) Inventors: Daisuke Nitta, Kawasaki (JP); Tetsuo Tomita, Kawasaki (JP); Tomonori Kumagai, Kawasaki (JP); Satoshi Watanabe, Kawasaki (JP); Kazunari Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 462 days.

(21) Appl. No.: 12/259,459

(22) Filed: Oct. 28, 2008

(65) Prior Publication Data
US 2009/0239547 A1    Sep. 24, 2009

(30) Foreign Application Priority Data

Mar. 19, 2008    (JP) .................. 2008-070975

(51) Int. Cl.
*H04W 72/00* (2009.01)
(52) U.S. Cl. .................. 455/452.2; 455/450; 455/422.1; 370/329; 370/341; 370/328
(58) Field of Classification Search ............... 455/422.1, 455/450, 451, 452.1, 452.2, 525, 444, 524; 370/338, 328, 329, 341, 431, 468
See application file for complete search history.

(56) References Cited

U.S. PATENT DOCUMENTS

| | | | |
|---|---|---|---|
| 5,577,029 A | 11/1996 | Lu et al. | |
| 5,734,699 A | 3/1998 | Lu et al. | |
| 5,734,979 A | 3/1998 | Lu et al. | |
| 5,761,195 A | 6/1998 | Lu et al. | |
| 5,818,824 A | 10/1998 | Lu et al. | |
| 5,842,138 A | 11/1998 | Lu et al. | |
| 5,887,256 A | 3/1999 | Lu et al. | |
| 5,953,651 A | 9/1999 | Lu et al. | |
| 5,999,813 A | 12/1999 | Lu et al. | |
| 6,081,716 A | 6/2000 | Lu | |
| 6,101,400 A | 8/2000 | Ogaz et al. | |
| 6,173,177 B1 | 1/2001 | Lu et al. | |
| 6,212,395 B1 | 4/2001 | Lu et al. | |

(Continued)

FOREIGN PATENT DOCUMENTS

| | | |
|---|---|---|
| EP | 1 739 988 | 1/2007 |
| EP | 1 843 618 | 10/2007 |

(Continued)

OTHER PUBLICATIONS

European Communication Pursuant to Article 94(3) EPC dated Jan. 24, 2011, from the corresponding European Application No. 08 167 876.5.
Felipe A. Cruz-Perez, et al., "Frequency Reuse and Distributed Dynamic Channel Assignment in Microcellular Systems", Communications Section, Electrical Engineering Department, 1997 IEEE, XP010247680.
European Communication Pursuant to Article 94(3) EPC dated Feb. 18, 2010, from the corresponding European Application.

(Continued)

*Primary Examiner* — Ajit Patel
(74) *Attorney, Agent, or Firm* — Katten Muchin Rosenman LLP

(57) ABSTRACT

A controller which is assigned with the wireless resources for a plurality of wireless zones and a plurality of wireless base stations communicably connected to the controller, wherein the controller is operable to assign a part of the assigned wireless resources to the wireless zone formed by any of the wireless base stations. According to this, it is possible to introduce and run a great number of wireless base stations at a low cost without increasing or modifying the number of the superordinate devices such as RNC.

14 Claims, 16 Drawing Sheets

U.S. PATENT DOCUMENTS

| | | | |
|---|---|---|---|
| 6,535,732 | B1 | 3/2003 | McIntosh et al. |
| 6,580,924 | B1 | 6/2003 | Lu et al. |
| 6,597,912 | B1 | 7/2003 | Lu et al. |
| 6,829,477 | B1 | 12/2004 | Lu et al. |
| 7,817,997 | B2 * | 10/2010 | Nylander et al. .......... 455/422.1 |
| 7,853,264 | B1 * | 12/2010 | Oh ................ 455/453 |
| 8,060,079 | B1 * | 11/2011 | Goyal et al. .................. 455/424 |
| 2002/0009991 | A1 | 1/2002 | Lu et al. |
| 2002/0077112 | A1 | 6/2002 | McIntosh et al. |
| 2004/0004943 | A1 | 1/2004 | Kim et al. |
| 2007/0097939 | A1 | 5/2007 | Nylander et al. |
| 2009/0061873 | A1 * | 3/2009 | Bao et al. ....................... 455/436 |
| 2009/0093246 | A1 * | 4/2009 | Czaja et al. ................ 455/422.1 |
| 2009/0104912 | A1 * | 4/2009 | Foster et al. .................. 455/446 |
| 2009/0163216 | A1 * | 6/2009 | Hoang et al. .................. 455/450 |
| 2009/0197588 | A1 * | 8/2009 | Khandekar et al. ......... 455/422.1 |
| 2009/0252099 | A1 * | 10/2009 | Black et al. .................. 370/329 |

FOREIGN PATENT DOCUMENTS

| | | |
|---|---|---|
| JP | 9-200838 | 7/1997 |
| JP | 2002-524989 | 8/2002 |
| JP | 2004-40802 | 2/2004 |
| JP | 2007-531424 | 11/2007 |
| WO | 2007/040449 | 4/2007 |

OTHER PUBLICATIONS

Kineto Wireless Inc, et al. "GAN Variant of Iu-based 3G HNB Architecture" 3GPP TSG-RAN WG3 Meeting #59, Feb. 5, 2008, XP050163335.

"3GPP Ts 43.318 V8.0.0; 3rd Generation Partnership Project; Technical Specification Group GSM/EDGE Radio Access Network; Generic Access Network (GAN); Stage 2 (Release 8)" Sophia Antipolis Cedex, Nov. 2007, XP007911663.

European Search Report dated Mar. 18, 2009, from the corresponding European Application.

Hiroki Yomogita "Korean Samsung, NEC and others Present Femto Cells" Nikkei Electronics, Feb. 20, 2007.

"Manufacturing Agreement for ZoneGate Low-Cost Residential 3G Access Point" Nov. 1, 2006, retrieved from http://www.3g.co.uk/PR/Nov2006/3849.htm.

Hidehiko Ohyane, et al. "Base Station Supporting IP Transport" Special Articles on IP-based RAN for Economical and Flexible Network Construction, NTT DoCoMo, Technical Journal, vol. 9, No. 1, p. 7-9, Apr. 2007.

Notification of Reason(s) for Refusal dated May 8, 2012, from corresponding Japanese Application No. 2008-070975.

* cited by examiner

FIG. 4

| CELL NUMBER | SC | CC | FREQUENCY | SHARED CHANNEL INFORMATION | ... |
|---|---|---|---|---|---|
| 001 | 000001 | 000001~000100 | 000001~000100 | 000001~000100 | ... |
| 002 | 000002 | 000101~000200 | 000101~000200 | 000101~000200 | ... |
| ... | ... | ... | ... | ... | ... |
| M | 00000M | 000M01~000M99 | 000M01~000M99 | 000M01~000M99 | ... |

FIG. 5

| FBTS NUMBER | IP ADDRESS | INFORMATION OF ADJACENT STATIONS | CELL NUMBER | SC | CC | FREQUENCY | SHARED CHANNEL INFORMATION | QUALITY MEASUREMENT RESULT | ... |
|---|---|---|---|---|---|---|---|---|---|
| 001 | 10.10.0.1 | 002, 003 | | | | | | | ... |
| 002 | 10.10.0.2 | 001, 003 | | | | | | | ... |
| ... | ... | ... | ... | ... | ... | ... | ... | ... | ... |
| n | 10.10.0.n | 001 | | | | | | | ... |

FIG. 7

| FBTS NUMBER | IP ADDRESS | INFORMATION OF ADJACENT STATIONS | CELL NUMBER | SC | CC | FREQUENCY | SHARED CHANNEL INFORMATION | QUALITY MEASUREMENT RESULT |
|---|---|---|---|---|---|---|---|---|
| 001 | 10.10.0.1 | 002, 003 | 001 | 000001 | 000001 ~ 000100 | 000001 ~ 000100 | 000001 ~ 000100 | |
| 002 | 10.10.0.2 | 001, 003 | 002 | 000002 | 000101 ~ 000200 | 000101 ~ 000200 | 000101 ~ 000200 | |
| . . . | . . . | . . . | . . . | . . . | . . . | . . . | . . . | . . . |
| n | 10.10.0.n | 001 | 00n | 00000n | 000n01 ~ 000n99 | 000n01 ~ 000n99 | 000n01 ~ 000n99 | |
| : | : | : | : | : | : | : | . . . | : |

FIG. 11

| FBTS NUMBER | IP ADDRESS | INFORMATION OF ADJACENT STATIONS | CELL NUMBER | SC | CC | FREQUENCY | SHARED CHANNEL INFORMATION | QUALITY MEASUREMENT RESULT |
|---|---|---|---|---|---|---|---|---|
| 001 | 10.10.0.1 | 002, 003 | 001 | 000001 | 000001~000100 | 000001~000100 | 000001~000100 | OK |
| 002 | 10.10.0.2 | 001, 003 | 002 | 000002 | 000101~000200 | 000101~000200 | 000101~000200 | |
| ... | ... | ... | ... | ... | ... | ... | ... | ... |
| n | 10.10.0.n | 001 | 00n | 00000n | 000n01~000n99 | 000n01~000n99 | 000n01~000n99 | |

FIG. 12

| FBTS NUMBER | IP ADDRESS | INFORMATION OF ADJACENT STATIONS | CELL NUMBER | SC | CC | FREQUENCY | SHARED CHANNEL INFORMATION | QUALITY MEASUREMENT RESULT | |
|---|---|---|---|---|---|---|---|---|---|
| 001 | 10.10.0.1 | 002, 003 | 001 | 000001 | 000001~000100 | 000001~000100 | 000001~000100 | OK | ... |
| 002 | 10.10.0.2 | 001, 003 | 002 | 000002 | 000101~000200 | 000101~000200 | 000101~000200 | NG | ... |
| ... | ... | ... | ... | ... | ... | ... | ... | | ... |
| n | 10.10.0.n | 001 | 00n | 00000n | 000n01~000n99 | 000n01~000n99 | 000n01~000n99 | OK | ... |

WIRELESS COMMUNICATION SYSTEM AND METHOD OF ASSIGNING WIRELESS RESOURCES IN THE SAME SYSTEM AND CONTROLLER

CROSS-REFERENCE TO RELATED APPLICATION(S)

This application is based upon and claims the benefit of priority of the prior Japanese Application No. 2008-070975 filed on Mar. 19, 2008 in Japan, the entire contents of which are incorporated by reference.

FIELD

The embodiment(s) discussed herein is directed to a wireless communication system and a method of assigning wireless resources in the same system and a controller. The embodiment(s) may be used for setting a great number of wireless base stations forming small sized cells called femtocells.

BACKGROUND

The wireless coverage indoors of a mobile communication system is not so good. This has some reasons; for example, wireless electric waves are difficult to reach the inside of a building and it costs much to set an indoor-typed wireless base station and to make use of it.

Under this situation, a microminiature wireless base station (BTS: Base Transceiver Station) called "Femtocell" has been proposed these days. This BTS is assumed to be used inside a house or office and it conforms to, for example, the W-CDMA (Wideband-Code Division Multiple Access) method, enabling a simultaneous communication for a small number of users (about four users) after forming a small sized cell (femtocell) having a radius of some tens meters. Further, the cost is low.

In order to improve the indoor coverage without raising the operation cost, it is considered that such a small BTS (hereinafter, referred to as a femtocell BTS) is arranged inside a tall building or an underground facility (dead zone) which could not be covered by the existing wireless base station.

Further, a technique of remotely setting an RF (Radio Frequency) unit connected with an existing base station unit via a cable line, is known as a means for improving the coverage of the mobile communication system.
[Patent Document 1] Japanese Patent Application Laid-Open No. 2004-40802
[Patent Document 2] Japanese Patent Application National Publication (Laid-Open) No. 2002-524989
[Non Patent Document 1] "A follow up article on 3GSM, Korea Samsung and NEC exhibit "Femtocell"
[Non Patent Document 2] "Manufacturing Agreement For Zone Gate Low-Cost Residential 3G Access Point".
[Non Patent Document 3] NTT DoCoMo Technical Journal Vol. No. 1, [online], April, 2007.

Since the femtocell BTS is supposed to be set indoors, the number of the femtocell BTSs being set is expected large. However, there is a limit to the capacity (for example, some hundreds BTSs) in a device which accommodates the base transceiver stations and controls them (RNC: Radio Network Controller). Therefore, it cannot help but increase the number of large-sized expensive RNCs, in order to accommodate a large number of femtocell BTSs (for example, more than some thousands BTSs).

The technique of Patent Document 1 is only a technique for just relaying a signal destined for a mobile station unit from a base station unit, through the RF unit connected with the base station unit via a cable line.

SUMMARY (1) One aspect of the wireless communication system disclosed here includes a controller which is assigned with wireless resources for a plurality of wireless zones, and a plurality of wireless base stations which are communicably connected to the controller, in which the controller assigns a part of the assigned wireless resources to a wireless zone formed by any of the wireless base stations.

(2) The number of the wireless zones formed by the respective wireless base stations may be more than the number of plurality of the wireless zones, and the assignment by the controller may be performed by re-using the plurality of wireless resources for the wireless zones.

(3) The assignment by the controller may be performed so that the re-used wireless resources do not overlap between the adjacent wireless zones formed by the respective wireless base stations.

(4) Further, the assignment by the controller may be adaptively changed according to the signal quality information between the wireless base stations.

(5) One aspect of a method of assigning wireless resources disclosed here is a method of assigning wireless resources, in a wireless communication system having a plurality of wireless base stations and a controller connected to the respective wireless base stations communicably, the method comprising a process of assigning the wireless resources for the wireless zones to the controller and wherein the controller assigns a part of the assigned wireless resources to the wireless zone formed by one of the wireless base stations.

(6) One aspect of a controller disclosed here is a controller communicably connected to a plurality of wireless base stations, which includes receiving means for receiving assignment information of wireless resources for a plurality of wireless zones, and assignment control means for assigning a part of the wireless resources formed by one of the wireless base stations based on the assignment information.

(7) The number of the wireless zones formed by the respective wireless base stations may be more than the number of the wireless zones, and the assignment control means may perform the above assignment by re-using the wireless resources for the wireless zones.

(8) The assignment control means may perform the above assignment so that the re-used wireless resources do not overlap between the adjacent wireless zones formed by the respective wireless base stations.

(9) Further, the assignment control means may include an assignment changing unit operable to change the assignment depending on the signal quality information between the wireless base stations.

(10) The wireless resources may include any one of or any combination of two or more of a scrambling code, a channelization code, and a frequency.

Additional objects and advantages of the embodiment will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 4 is a view illustrating the format example of the cell setting information for FBTS controller in the data storage unit of the FBTS controller illustrated in FIG. 2;

FIG. 5 is a view illustrating the format example of the cell setting information for FBTS in the data storage unit of the FBTS controller illustrated in FIG. 2;

FIG. 7 is a view illustrating one example of a state where the cell setting information for the FBTS is written in the format example illustrated in FIG. 5;

FIG. 11 is a view illustrating one example of a state where a quality measurement result is written in the format example illustrated in FIG. 5;

FIG. 12 is a view illustrating one example in a state where a quality measurement result is written in the format example illustrated in FIG. 5;

DESCRIPTION OF EMBODIMENT(S)

Figure 1:
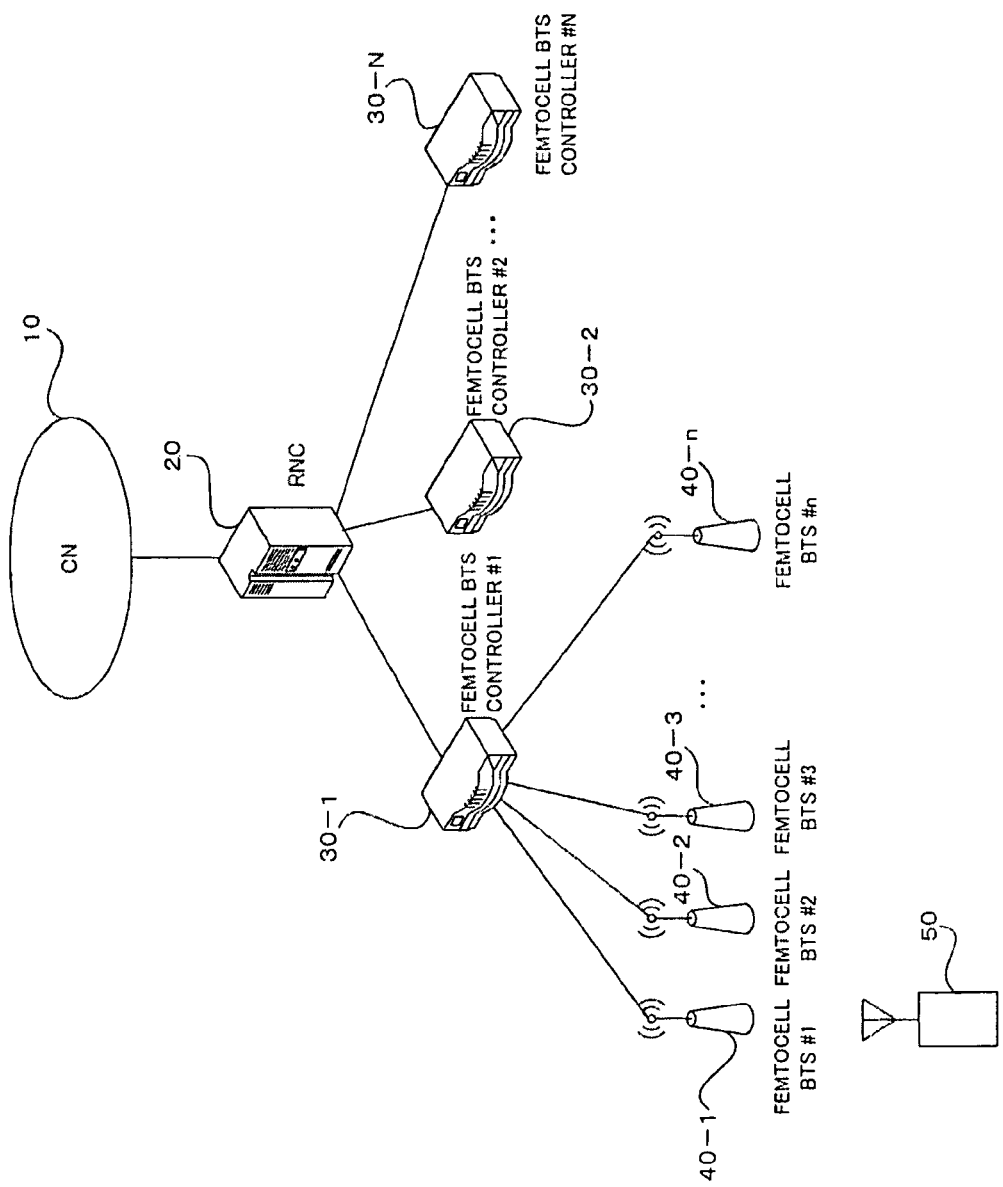
FIG. 1 is a view illustrating the constitutional example of a femtocell system that is a wireless communication system according to one embodiment.

Hereinafter, an embodiment will be described referring to the drawings. The embodiment described below is only an example and it is not intended to exclude various modifications and applications of the technique not specified below. Namely, the embodiment can be performed variously modified (in combination of the respective embodiments and the like) within the range not departing from the spirit.

[1] System Structure

FIG. 1 is a view illustrating the constitutional example of a femtocell system that is a wireless communication system according to an embodiment. The system illustrated in FIG. 1 includes, for example, a core network (CN) 10, at least one radio network controller (RNC, BTS controller) 20 connected to this CN 10, the number N (N is the integer of 1 or more) of super small BTS controllers (femtocell BTS controllers) 30-1 to 30-N, the number n (n is the integer of 1 or more) of super small BTSs (femtocell BTSs) 40-1 to 40-n, and one or a plurality of mobile terminals (user terminal) 50.

Here, the superordinate networks of the RNC 20 located in a wireless access network such as W-CDMA are collectively called the CN 10, having entities for managing subscriber information, monitoring and managing the respective networks, and establishing access to another network.

The RNC 20 is a device which can accommodate and control one or a plurality of existing BTSs (it is also called Node B), provided with a function of transceiving signals such as data (namely, control signals) of control plane (C-Plane) and data (namely, user signals) of user plane (U-Plane) between the existing BTSs.

The C-Plane data includes, for example, a call control signal destined for the mobile terminal 50 and an Node B Application Part (NBAP) signal that is a signal about a base transceiver station control. From the viewpoint of a wireless channel between the femtocell BTS controller (hereinafter, represented as an FBTS controller) 30-i and the femtocell BTS (hereinafter, represented as an FBTS) 40-j, the C-Plane data includes the signals about a shared channel, an individual channel, an announcement channel, and a paging channel. The U-Plane data includes the signals about a shared channel and an individual channel.

The RNC 20 of this example can accommodate the number N of FBTS controllers 30-1 to 30-N together or alternatively with the existing BTSs and it can transceiver the signals between these FBTS controllers 30-i (i=any of 1 to N) in the same way as between the existing BTSs. The connection interface (IF) between the RNC 20 and the FBTS controller 30-i may be the same as the connection IF (for example, Iub interface) between the RNC 20 and the existing BTS.

The FBTS controller 30-i can respectively accommodate the number n of the FBTSs (femtocell base transceiver stations) 40-1 to 40-n, provided with a function of setting a cell for one dependent FBTS 40-j (j=any of 1 to n) and changing (modifying) its setting according to the control signal received from the RNC 20.

The "cell setting" means the setting about the wireless resources for a wireless zone (cell) formed by the FBTS 40-j. The wireless resources include any one of or any combination of two or more of a scrambling code (SC), a channelization code (CC), and usable frequency (carrier), in every cell, taking the W-CDMA method as an example. The SC is a code used for identifying a cell (cell search) and the CC is a code used for identifying a user (mobile terminal 50).

By introducing this FBTS controller 30-i, the RNC 20 performs the cell setting for one existing BTS on one FBTS controller 30-i, using the same control signal (for example, NBAP signal) as that for the existing BTS, hence to make it possible to collectively perform the cell setting on the respective dependent FBTS 40-j on the FBTS controller 30-i.

In other words, a plurality of the FBTSs 40-j can be regarded (recognized) virtually as one BTS from the viewpoint of the RNC 20. For example, the respective FBTSs 40-j can be recognized by the RNC 20 as one BTS which deals a plurality of cells and carriers like a multi-band BTS or a high density BTS.

For example, the RNC 20 can recognize the FBTSs as a BTS having the total nine cells of three cells×three carriers (frequency). In this case, the RNC 20 assigns the cell setting information (wireless resources) for nine cells to the FBTS controller 30-*i* according to the NBAP signal. Namely, the number of the cell setting information which can be assigned to the FBTS controller 30-*i* is less than the number of the cell setting information of which unit the RNC 20 recognizes and manages.

The FBTS 40-*j* is a base station unit which can form one or a plurality of cells that is a wireless zone, to do a wireless communication through connecting to one or a plurality of mobile terminals 50 existing in the above cell or cells via a wireless link, and it is set, for example, inside a house or an office. The FBTS 40-*j* is different from the existing BTS in the following points.

(1) In the existing BTS, the number of users (mobile terminals) simultaneously connectable is several hundreds, while in the existing FBTS, it is small, about ten.

(2) In the existing BTS, the number of cells is about several cells to several tens of cells, while in the FBTS, it is very small, about one.

(3) In the existing BTS, the coverage of electric waves (radius of a cell) is several kilometers, while in the FBTS, it is narrow, several ten meters.

The mobile terminal 50 is a wireless terminal used by a user, provided with a function of connecting with and communicating with any of FBTSs 40-*j* via a wireless link (for example, terminating function of call processing).

[2] FBTS Controller and Super Small BTS

The constitutional example of the FBTS controller 30-*i* and the super small BTS 40-*j* of this embodiment will be described referring to FIG. 2.

(2.1) FBTS Controller 30-*i*

Figure 2:
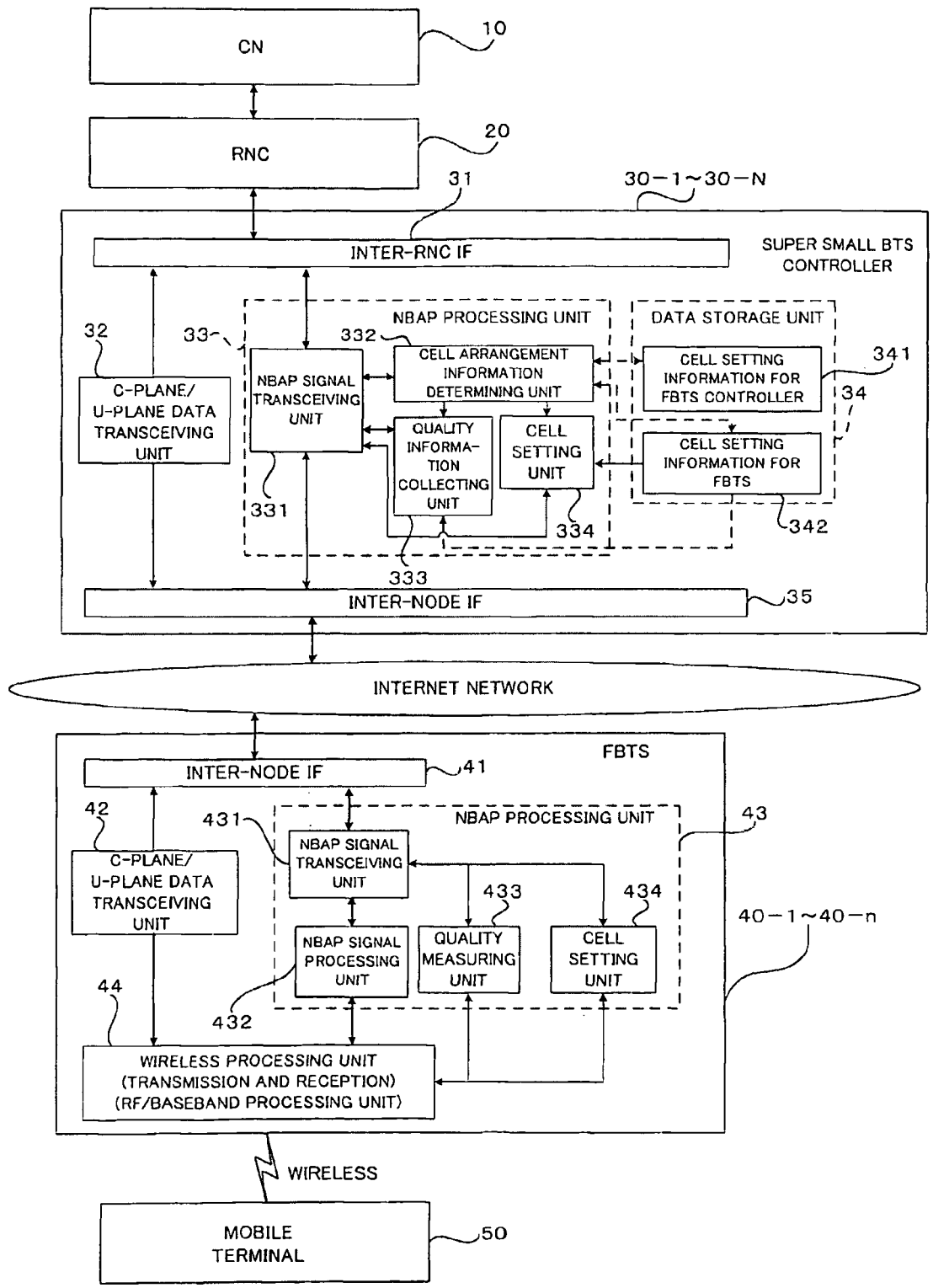
FIG. 2 is a block diagram illustrating the detailed constitutional example of the system illustrated in FIG. 1.

As illustrated in FIG. 2, the FBTS controller 30-*i* includes, for example, an inter-RNC IF 31, a C-Plane/U-Plane data transceiving unit 32, an NBAP processing unit 33, a data storage unit 34, and an inter-node IF 35.

Here, the inter-RNC IF 31 is an IF with the RNC 20, provided with a function of transceiving the signals such as C-Plane data (control signals) and U-Plane data (user data) to and from the RNC 20.

The C-Plane/U-Plane data processing unit 32 receives the control signal and the user data about the mobile terminal 50 transmitted from the RNC 20, transmits the above to the super small BTS 40-*j* to which the corresponding mobile terminal 50 is connected, after identifying the number of the mobile terminal, while transmits to the RNC 20 the control signal and user data received from the super small BTS 40-*j*.

The NBAP processing unit 33 has a function of processing the NBAP signal that is the signal about the control of the base transceiver station, of the C-Plane data.

The NBAP processing unit 33 further includes, for example, an NBAP signal transceiving unit 331, a cell arrangement information determining unit 332, a quality information collecting unit 333, and a cell setting unit 334.

The NBAP signal transceiving unit 331 is to transmit and receive the NBAP signals. Here, any signal other than the signal about the cell arrangement information determining unit 332 can be transmitted to the corresponding FBTS 40-*j*.

When receiving a cell setting request (cell setting information) from the RNC 20, for example, in the NBAP signal via the NBAP signal transceiving unit 331, the cell arrangement information determining unit 332 has a function of recording the received cell setting information in an FBTS controller cell setting information memory 341 of the data storage unit 34 and recording the cell setting information of each FBTS 40-*j* assigned according to the above cell setting information, in the FBTS cell setting information memory 342 of the data storage unit 34.

When further receiving the quality information of each FBTS 40-*j* from the quality information collecting unit 333, the cell arrangement information determining unit 332 has a function of confirming whether or not there is a trouble in the signal quality between the adjacent FBTSs 40-*j* (electric wave interference occurs or not) and changing (modifying) the cell setting information when there is the trouble. The memories 341 and 342 may be shared.

The quality information collecting unit 333 has a function of asking the corresponding dependent FBTSs 40-*j* on this FBTS controller 30-*i* about the quality measurement of signal-to-interference ratio (SIR) at a time of initial cell arrangement, or according to an instruction from the cell arrangement information determining unit 332, or periodically and collecting (receiving) the measurement results (quality measurement information). The received quality measurement information is transmitted to the cell arrangement information determining unit 332.

The cell setting unit 334 has a function of instructing the corresponding dependent FBTSs 40-*j* on this FBTS controller 30-*i* to do the cell setting, based on the cell setting information of the FBTS cell setting information memory 342 of the data storage unit 34, according to the instruction of the cell arrangement information determining unit 332. Upon receipt of the setting results (OK/NG) from the respective FBTSs 40-*j*, it transmits the above results to the cell arrangement information determining unit 332.

The data storage unit 34 stores (records) two kinds of information: the cell setting information assigned to this FBTS controller 30-*i* and the cell setting information on the corresponding dependent FBTSs 40-*j* on this FBTS controller 30-*i* in the FBTS controller cell setting information memory 341 and the FBTS cell setting information memory 342.

The respective pieces of cell setting information includes the setting information about the wireless resources used for a wireless communication between the FBTS 40-*j* and the mobile terminal 50, for example, the scrambling code (SC) information, channelizationcode (CC) information, usable frequency, and shared channel information, for every cell on the FBTS 40-*j*.

The inter-node IF 35 is an IF with the FBTS 40-*j*, provided with a function of transceiving signals such as C-Plane data (including the NBAP signal) and U-Plane data.

One or all of the function of the above FBTS controller 30-*i* may be provided in the RNC 20. In this case, the FBTS controller 30-*i* is assigned with the wireless resources (cell setting information) for a plurality of cells from the superordinate function of the RNC 20.

When a part of the function of the RNC 20 is built in the base station unit, like an eNode B in the next generation mobile communication system, the FBTS controller 30-*i* may be connected not to the RNC 20 but to the eNode B, or the superordinate device of the eNode B such as access gateway (aGW). In this case, the FBTS controller 30-*i* can perform the cell setting on the dependent FBTS 40-*j*, after being assigned with the cell setting information for the number of the cells set at, for example, one eNode B from this eNode B and the superordinate device.

(2.2) FBTS 40-*j*

The FBTS 40-*j* includes, for example, an inter-node IF 41, a C-Plane/U-Plane data transceiving unit 42, an NBAP processing unit 43, and a wireless processing unit 44, as illustrated in FIG. 2.

The inter-node IF 41 is an IF with the FBTS controller 30-*i*, provided with a function of transceiving signals such as C-Plane data (including the NBAP signal) and U-Plane data.

The C-Plane/U-plane data processing unit 42 has a function of receiving a call control signal and user data about the mobile terminal 50 transmitted from the FBTS controller 30-*i* and transmitting the above to the mobile terminal 50 while receiving the C-Plane/U-plane data transmitted by the mobile terminal 50 from the FBTS 40-*j* and transmitting the above to the FBTS controller 30-*i*.

The NBAP processing unit 43 has a function of processing the NBAP signal that is the signal about the base transceiver station control, of the C-Plane data.

The NBAP processing unit 43 further includes, for example, an NBAP signal transceiving unit 431, an NBAP signal processing unit 432, a quality measuring unit 433, and a cell setting unit 434.

The NBAP signal transceiving unit 431 has a function of transceiving NBAP signals. Here, the signals other than the signals about the cell arrangement information determining unit 332 of the FBTS controller 30-*i* can be transmitted to the corresponding FBTS 40-*j*.

The NBAP signal processing unit 432 has a function of processing (terminating) the NBAP signals other than the signals about the cell arrangement information determining unit 332 of the FBTS controller 30-*i*.

The quality measuring unit 433 has a function of asking (setting the quality) the quality measurement of the wireless processing unit 44 when there is a quality measurement request such as SIR from the quality information collecting unit 333 of the FBTS controller 30-*i* through the NBAP signal transceiving unit 431. The quality measurement result is transmitted to the quality information collecting unit 333 of the superordinate FBTS controller 30-*i*.

The cell setting unit 434 has a function of performing the cell setting on the wireless processing unit 44, according to the cell setting information determined by the cell arrangement information determining unit 332 of the FBTS controller 30-*i* and received from the cell setting unit 334. It can transmit the setting result (OK/NG) to the cell setting unit 334 of the FBTS controller 30-*i*.

The wireless processing unit (RF/baseband processing unit) 44 is an IF with the mobile terminal 50, provided with a function of transceiving signals such as C-Plane data and U-Plane data in wireless signals.

[3] Operation

The following processing illustrated in (a) and (b) is possible in the femtocell system of this embodiment constituted as mentioned above.

(a) Processing that the RNC 20 transmits the cell setting information to the FBTS controller 30-*i* and that the FBTS controller 30-*i* performs cell setting on the dependent FBTS 40-*j* according to the cell setting information (cell setting processing)

(b) Processing that the RNC 20 transmits a quality confirming request to the FBTS controller 30-*i* at the initial cell setting time or regularly and that the FBTS controller 30-*i* performs the quality measurement of the cells of the dependent FBTS 40-*j*, upon receipt of the above quality confirming request, to adaptively change the cell setting based on the information (cell setting modification processing)

The respective processings will be hereinafter described individually.

(3.1) Cell Setting Processing

At first, the cell setting processing will be specifically described using FIG. 3 to FIG. 9.

Figure 9:
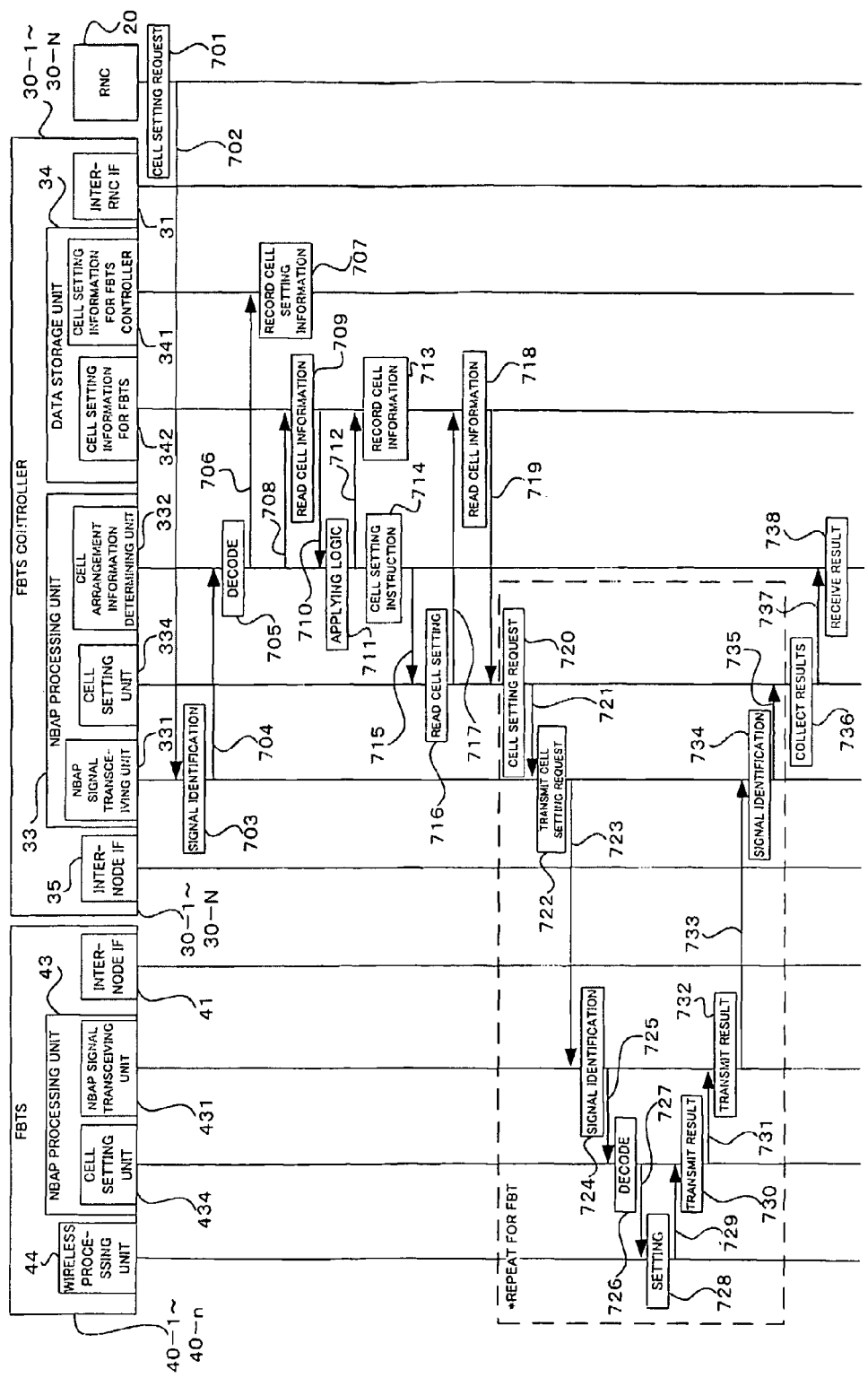
FIG. 9 is a sequence view explaining the operation (cell setting processing) in the femtocell system illustrated in FIGS. 1 and 2.

The RNC 20 creates a cell setting request (cell setting information) destined for the FBTS controller 30-*i* (processing 701) and transmits it to the FBTS controller 30-*i* (processing 702), for example, as illustrated in FIG. 9. For example, NBAP signals can be used for the cell setting request. In the case of the NBAP signals of the 3GPP standard, "Cell Setup Request", "Common Transport Channel Setup Request" and the like can be used.

Figure 3:
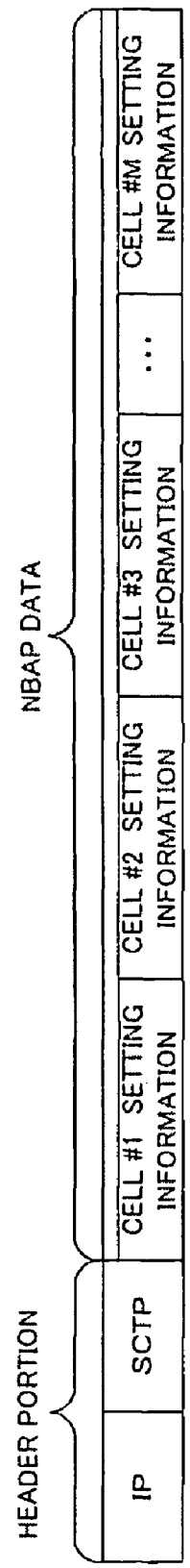
FIG. 3 is a view illustrating a format example of a cell setting request (NBAP signal) transmitted from the RNC to the FBTS in FIGS. 1 and 2.

A format example of the NBAP signal is illustrated in FIG. 3. The NBAP signal includes a header portion and a data portion, and the cell setting information (assignment information of wireless resources) for one existing BTS can be set in (attached to) the data portion. For example, assuming that the number of cells dealt by one existing BTS is M cell (M is the integer of two or more), the cell setting information for M cells: cell #1 to #M is attached there. Namely, the RNC 20 works as a means of assigning wireless resources for a plurality of cells to the FBTS controller 30-*i* that is the first controller.

When the FBTS controller 30-*i* receives the cell setting information for the above M cells (when it is assigned with the wireless resources for the M cells), it assigns a part of the assigned wireless resources to the cells formed by any of dependent FBTSs 40-*j* (cell setting).

When the number of the cells which the dependent FBTSs 40-*j* form is more than the cell setting information for the M cells assigned from the RNC 20, it becomes short of the wireless resources (cell setting information) that the FBTS controller 30-*i* can assign. In this case, the FBTS controller 30-*i* performs the cell setting on the FBTSs 40-*j* by re-using the cell setting information for the M cells (cell reuse).

FIG. 3 illustrates the state of attaching a header of the SCTP (Stream Control Transmission Protocol) and IP (Internet Protocol) that is the protocol stack of the lower layer of the NBAP signal as the header portion of the NBAP signal, but needless to say, it is not restricted to this example. It can be properly changed depending on the protocol of the connection IF used between the RNC 20 and the FBTS controller 30-*i*. For example, when the RNC 20 and the FBTS controller 30-*i* are connected not through the Internet network but through the ATM (Asynchronous Transfer Mode) network, the ATM header may be attached to the header portion of the NBAP signal.

The cell setting request is received by the NBAP signal transceiving unit 331 through the inter-RNC IF 31 of the FBTS controller 30-*i*. Namely, the NBAP signal transceiving unit 331 works as a receiving means for receiving assignment information of the wireless resources for a plurality of cells (cell setting information).

The NBAP signal transceiving unit 331 identifies whether the received NBAP signal is a cell setting request for the FBTS controller 30-*i* (the processing 703 in FIG. 9); when it is the cell setting request, it transmits the same cell setting request to the cell arrangement information determining unit 332 (the processing 704 in FIG. 9). When it is not the cell setting request, the NBAP signal transceiving unit 331 transmits the received NBAP signal to the target FBTS 40-*j* (the NBAP signal processing unit 432).

Upon receipt of the cell setting request, the cell arrangement information determining unit 332 decodes the same cell setting request (the processing 705 in FIG. 9), and records the cell setting information for the M cells assigned to this request in the FBTS controller cell setting information memory 341 of the data storage unit 34 (the processings 706 and 707 in FIG. 9).

One example of the recording format is illustrated in FIG. 4. FIG. 4 illustrates the state of recording the information on SC, CC, frequency, and shared channel in the memory 341 in every cell number of the M cells as the cell setting information for FBTS controller.

After this recording, or in parallel with this recording, the cell arrangement information determining unit 332 records the cell setting information for n pieces of the dependent FBTSs 40-j in the FBTS cell setting information memory 342 of the data storage unit 34, based on the received cell setting information (the processing 713 in FIG. 9).

One example of the recording format is illustrated in FIG. 5. FIG. 5 illustrates the state of recording the information on IP address, the information about the adjacent FBTSs 40-j (cells) (the information about the adjacent devices) (that is, the information about the situation of the adjacent cells), the information on cell number, SC, CC, frequency, shared channel, and quality measurement result, in the memory 342 as the cell setting information for FBTS, in every device number of the FBTS 40-j, assuming that the FBTS 40-j is connected to the FBTS controller 30-i through the Internet network, as illustrated in FIG. 2.

The device number of the FBTS 40-j and the IP address may be set static as the initial setting. Alternatively, they may be dynamically set through the communication with the FBTS 40-j.

The cell arrangement information determining unit 332 records the cell setting information for FBTS in (applies the cell setting information to) the memory 342, according to a predetermined applying logic (cell arrangement logic), for example, based on the assigning sequence (device number) of the dependent FBTSs 40-j previously recorded in the FBTS cell setting information memory 342 (the processing 708 to the processing 713 in FIG. 9).

As one example of the applying logic, there is a logic of positioning the cells so that the same cell setting information (wireless resources) may not overlap between the adjacent cells (between each device number assuming one cell per one FBTS 40-j) (assigning the "adjacent device information (cell number)" in FIG. 5). One example of the logic is illustrated in FIG. 6.

Figure 6:
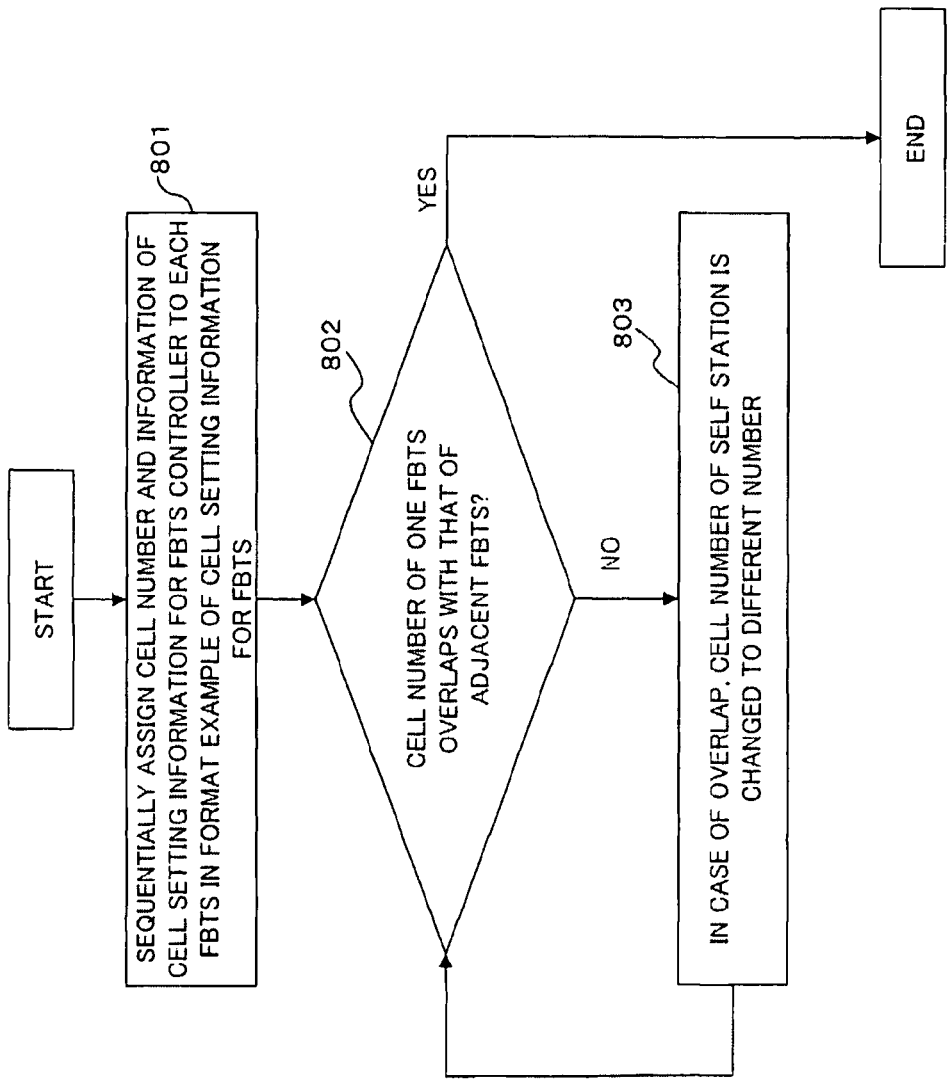
FIG. 6 is a flow chart illustrating one example of the cell assignment logic in the FBTS controller illustrated in FIG. 2.

As illustrated in FIG. 6, the cell arrangement information determining unit 332 sequentially assigns the cell number and information of the cell setting information for FBTS controller to each FBTS 40-j within the format of the cell setting information for FBTS (the processing 801), identifies whether the cell number of one FBTS 40-j overlaps with that of the adjacent FBTS 40-j (the processing 802); when the same cell number exists among the adjacent stations 40-j, the above assigned cell number is changed to a different number (YES in the processing 802) until there exists no same cell number (until it is judged NO in the processing 802).

One example of the cell setting information for FBTS set in the memory 342 according to the above logic is illustrated in FIG. 7. By executing this cell number assignment logic, when M<n, the cell setting information is set in the number n of FBTSs 40-j while re-using the cell setting information for the M cells.

At that time, since the cells are arranged not to adjacently overlap each other in the cell setting information (namely, so that the adjacent cells do not use the same wireless resources), it is possible to restrain the electric wave interference occurring between the cells. On the other hand, when M≧n, the repetition may not be performed and the cell setting (cell arrangement) free from the electric wave interference can be performed.

The information on the adjacent stations may be set static in advance. Alternatively, this information may be optional and therefore omitted.

The cell arrangement information determining unit 332 instructs the cell setting unit 334 to perform the cell setting on the dependent FBTS 40-j (the processings 714 and 715 in FIG. 9).

Upon receipt of the instruction, the cell setting unit 334 reads out the cell setting information recorded as mentioned above in the FBTS cell setting information memory 341 of the data storage unit 34 (the processings 716 to 719 in FIG. 9), and transmits the cell setting request to the NBAP signal transceiving unit 331 (the processings 720 and 721) in order to do the cell setting request to the dependent FBTS 40-j.

Upon receipt of the cell setting request, the NBAP signal transceiving unit 331 transmits the above cell setting request to any of FBTSs 40-j through the inter-node IF 35 (the processings 722 and 723 in FIG. 9). Here, the NBAP signal based on the 3GPP standard such as "Cell Setup Request" and "Common Transport Channel Setup Request" can be used for the above cell setting request. The format example of this NBAP signal is illustrated in FIG. 8.

Figure 8:
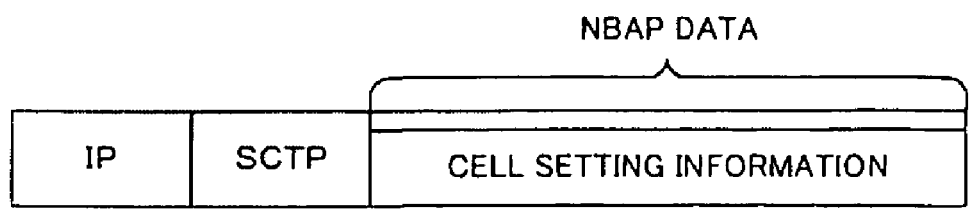
FIG. 8 is a view illustrating the format example of the cell setting information (NBAP signal) transmitted from the FBTS controller to the FBTS illustrated in FIG. 2.

As illustrated in FIG. 8, for example, the cell setting information for one cell is set in the data portion of the NBAP signal. A header of the protocol depending on the connection IF between the FBTS controller 30-i and the FBTS 40-j is attached to the header portion. The NBAP signal transceiving unit 331 creates an NBAP signal of this format.

Namely, the NBAP processing unit 33 and the data storage unit 34 of this example work as an assignment control means for assigning a part of the wireless resources to the cell (wireless zone) formed by any of dependent FBTSs 40-j, based on the cell setting information (assignment information of the wireless resources for a plurality of cells as an example of the wireless zone) received from the RNC 20.

On the other hand, the FBTS 40-j receives the NBAP signal (cell setting request) transmitted by the FBTS controller 30-i, in the NBAP signal transceiving unit 431 through the inter-node IF 41 and the NBAP signal transceiving unit 431 identifies whether it is a cell setting request to the FBTS 40-j or not (the processing 724 in FIG. 9).

As a result, when the received NBAP signal is a cell setting request, the NBAP signal transceiving unit 431 transmits the cell setting request to the cell setting unit 434 (processing 725 in FIG. 9). When it is an NBAP signal other than the cell setting request, the NBAP signal transceiving unit 431 transmits the NBAP signal to the NBAP signal processing unit 432.

Upon receipt of the NBAP signal that is the cell setting request, the cell setting unit 434 decodes the received NBAP signal (the processing 726 in FIG. 9), and performs the cell setting for the wireless processing unit 44 (the processings 727 and 728 in FIG. 9), based on the set contents (cell setting information).

The cell setting unit 434 transmits the setting result (OK/NG) to the NBAP signal transceiving unit 431 (the processings 729 to 731 in FIG. 9), and the NBAP signal transceiving unit 431 transmits the received setting result to the FBTS controller 30-i through the inter-node IF 41 as the NBAP signal (the processings 732 and 733 in FIG. 9).

The NBAP signal used for transmitting the setting result (OK/NG) may be "Cell Setup Response (in the case of OK)" or "Cell Setup Failure (in the case of NG)" in reply to "Cell Setup Request" in the 3GPP standard, or it may be "Common Transport Channel Setup Response (in the case of OK)" or "Common Transport Channel Setup Failure (in the case of NG)" in reply to "Common Transport Channel Setup Request".

The NBAP signal transceiving unit 331 receives the setting result (OK/NG) through the inter-node IF 35 of the FBTS controller 30-*i* and identifies whether or not the received NBAP signal is the result of the cell setting (the processing 734 in FIG. 9).

As a result, when the received NBAP signal is the setting result, the NBAP signal transceiving unit 331 decodes the received NBAP signal and transmits the setting result (OK/NG) set in the data portion to the cell setting unit 334 (the processing 735 in FIG. 9). It transmits the NBAP signal other than the setting result to the NBAP signal processing unit 432.

The cell setting unit 334 makes the cell setting requests for the number of the dependent FBTSs 40-*j* and receives the respective setting results (OK/NG). It totalizes the setting results for the number of the dependent FBTSs 40-*j* and transmits the above to the cell arrangement information determining unit 332 (the processings 736 and 737 in FIG. 9).

Upon receipt of the setting results, the cell arrangement information determining unit 332 manages the setting results (the processing 738 in FIG. 9). For example, it can manage the above as one of the information element of the cell setting information for FBTS of the format illustrated in FIG. 5 (FIG. 7). As for the FBTS 40-*j* where the setting result is NG, it is shifted to a quasi normal operation. Here, the quasi normal operation includes, for example, a notification to a person in charge of maintenance and logging.

As mentioned above, according to the embodiment, the RNC 20 transmits a cell setting request (cell setting information) to the FBTS controller 30-*i* and upon receipt of this, the FBTS controller 30-*i* performs the cell setting (assignment of the wireless resources) on the number m of the dependent FBTSs 40-*j*, based on the received cell setting information, thereby making it possible to perform the cell setting on the FBTSs 40-*j* without the RNC 20 directly involved.

Therefore, by introducing the FBTS controller 30-*i* in the system, it is possible to accommodate a great number of FBTSs 40-*j* into the RNC 20 and to do the proper cell setting easily and at a low cost, without largely modifying the structure of the existing RNC 20 (for example, the RNC 20 is designed to manage the information for the cell setting for a great number of FBTSs 40-*j* as the self station data) and without increasing the number of the RNCs 20.

(3.2) Cell Setting Modification Processing

Next, processing for modifying the cell setting based on the measurement result obtained by the FBTS controller 30-*i* after it measures the quality of the dependent FBTS 40-*j* will be described in details with reference to FIGS. 10 to 16.

Figure 15:
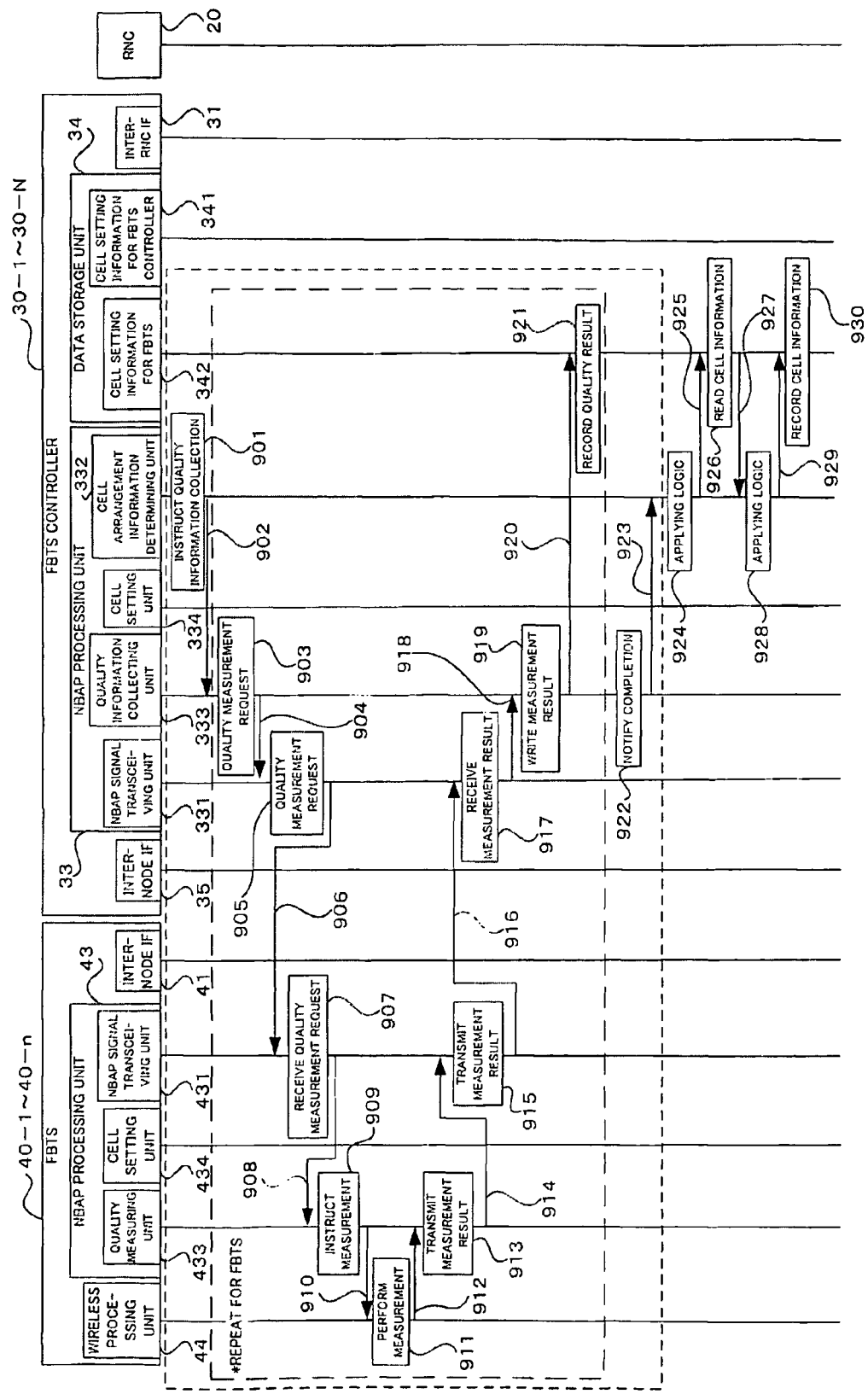
FIG. 15 is a sequence view explaining the operation (cell setting modification processing) of the femtocell system illustrated in FIGS. 1 and 2.

At first, the FBTS controller 30-*i* instructs the quality information collecting unit 333 to collect the quality information, through the cell arrangement information determining unit 332 of the NBAP processing unit 33 (the processing 901 and the processing 902 in FIG. 15). This instruction can be issued at a time of assignment of the cells, at a time of receiving the quality confirming request from the RNC 20, or periodically (regularly). The cell arrangement time means the point of finishing the "cell setting processing" having been described in the heading (3.1).

Upon receipt of the instruction, the quality information collecting unit 333 reads out the cell setting information for FBTS from the memory 342 of the data storage unit 34 and transmits the quality measurement request for the dependent FBTS 40-*j* to the NBAP signal transceiving unit 331 (the processings 903 and 904 in FIG. 15).

Upon receipt of the quality measurement request, the NBAP signal transceiving unit 331 creates an NBAP signal including the quality measurement request (data) and transmits it to the FBTS 40-*j* through the inter-node IF 35 (the processings 905 and 906 in FIG. 15).

Figure 10:
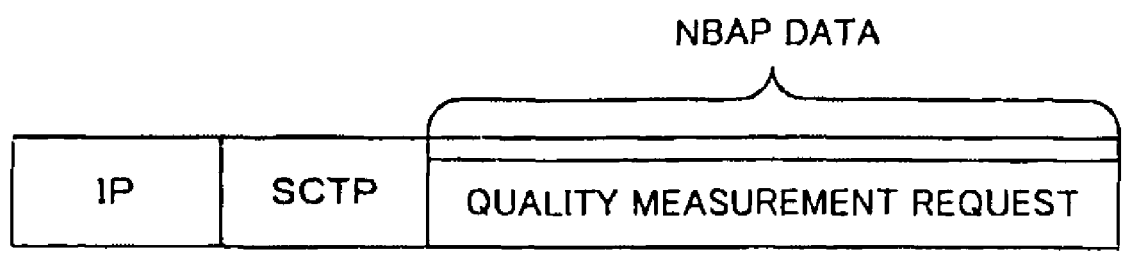
FIG. 10 is a view illustrating a format example of a quality measurement request (NBAP signal) transmitted from the FBTS controller to the FBTS illustrated in FIGS. 1 and 2.

The NBAP signal in the 3GPP standard, for example, "COMMON MEASUREMENT INITIATION REQUEST" can be used for this quality measurement request. The format example is illustrated in FIG. 10. Also in this example, a header depending on the connection IF (protocol) between the FBTS controller 30-*i* and the FBTS 40-*j* is attached to the header portion. As one example, FIG. 10 illustrates the state of attaching the IP/SCTP header there.

The NBAP signal transceiving unit 431 of the NBAP processing unit 43 receives the quality measurement request (NBAP signal) through the inter-node IF 41 of the FBTS 40-*j* (the processing 907 in FIG. 15), and identifies whether or not the received NBAP signal is a quality measurement request for the FBTS 40-*j*.

When it is the quality measurement request, the NBAP signal transceiving unit 431 transmits this request to the quality measuring unit 433 (the processing 908 in FIG. 15). On the other hand, when it is not the quality measurement request, it transmits the received NBAP signal to the NBAP signal processing unit 432.

Although FIG. 15 omits the illustration, the NBAP signal transceiving unit 431 may transmit the acknowledgement to the quality measurement request, to the FBTS controller 30-*i* through the inter-node IF 41. At that time, a response signal "COMMON MEASUREMENT RESPONSE" of the NBPA signal based on the 3GPP standard "COMMON MEASUREMENT INITIATION REQUEST", can be used. This response is received by the quality information collecting unit 333 of the FBTS controller 30-*i*, for example, as acknowledgement.

In the FBTS 40-*j*, upon receipt of the quality measurement request, the quality measuring unit 433 transmits the instruction of the quality measurement to the wireless processing unit 44 (the processings 909 and 910 in FIG. 15).

Upon receipt of this instruction, the wireless processing unit 44 measures the value about the transmission quality such as SIR between itself and the mobile terminal 50 (the processing 911 in FIG. 15) and returns the quality measurement result to the quality measuring unit 433 (the processing 912 in FIG. 15). The quality measurement result may be the information (OK/NG) indicating whether the transmission quality is in the permissible range or the measured value itself.

This quality measurement may be autonomously performed by the FBTS 40-*j* or it may be performed in cooperation with the other FBTS 40-*j*. In the former case, the receiving sensibility of the self station 40-*j* (wireless processing unit 44) may be temporarily raised to improve the measurement precision. In the latter case, the transmitting electric power of the other FBTS 40-*j* may be temporarily raised, to receive (detect) the interference electric wave that could not be measured by the previous transmitting electric power, in addition to the above method of raising the receiving sensibility of the self station 40-*j* (wireless processing unit 44) temporarily.

Owing to these attempts, it may be possible to measure the electric wave interference in the intersection area of the FBTS controller 30-*i* which could not be observed or which would be difficult to observe usually. As an example of a means for raising the receiving sensibility, the amplification output of a low noise amplifier provided in the receiving system may be raised.

Next, upon receipt of the quality measurement result, the quality measuring unit 433 transmits the quality measurement result (measured value of SIR and the like) to the NBAP signal transceiving unit 431 (the processings 913 and 914 in FIG. 15), and the NBAP signal transceiving unit 431 creates an NBAP signal including the received quality measurement result in the data portion and transmits the NBPA signal to the FBTS controller 30-$i$ through the inter-node IF 41 (the processings 915 and 916 in FIG. 15). Here, the NBAP signal including the quality measurement result can use "COMMON MEASUREMENT REPORT" based on the 3GPP standard.

The NBAP signal transceiving unit 331 of the NBAP processing unit 33 receives the quality measurement result (NBAP signal) through the inter-node IF 35 of the FBTS controller 30-$i$ (the processing 917 in FIG. 15), and identifies whether or not the received NBAP signal is a quality measurement result.

When it is the quality measurement result, the NBAP signal transceiving unit 331 transmits the received quality measurement result to the quality information collecting unit 333 (the processing 918 in FIG. 15), otherwise, transfers the received NBAP signal to the RNC 20 through the inter-RNC IF 31.

Upon receipt of the quality measurement result, the quality information collecting unit (quality information receiving unit) 333 registers the above quality measurement result, for example, in the entry of the quality measurement result on the corresponding station in the FBTS cell setting information memory 342 of the data storage unit 34 (the processing 919 to the processing 921 in FIG. 15). One example of the above is illustrated in FIG. 11. FIG. 11 illustrates the state of registering OK as the quality measurement result in the entry of the FBTS 40-$j$ of the device number=001.

When the above processing 903 to 921 has been completed on all the FBTSs 40-$j$ dependent on the FBTS controller 30-$i$, the quality information collecting unit 333 of the FBTS controller 30-$i$ notifies the cell arrangement information determining unit 332 of the quality measurement completion (the processings 922 and 923).

At this stage, the quality measurement results for all the dependent FBTSs 40-$j$ have been registered in the FBTS cell setting information memory 342 of the data storage unit 34. One example of the above is illustrated in FIG. 12. FIG. 12 illustrates the state of registering to the effect that the quality measurement result is NG in the FBTS 40-$j$ of the device number=002.

Upon receipt of the notification of completing the quality measurement, the cell arrangement information determining unit 332 assigns different SC and CC to the FBTS 40-$j$ that is NG in the measurement result (or which does not satisfy a predetermined reference of the measurement value) and changes (modifies) the FBTS 40-$j$ that is NG to a value which restrains the electric wave interference with the adjacent device 40-$j$.

Figure 13:
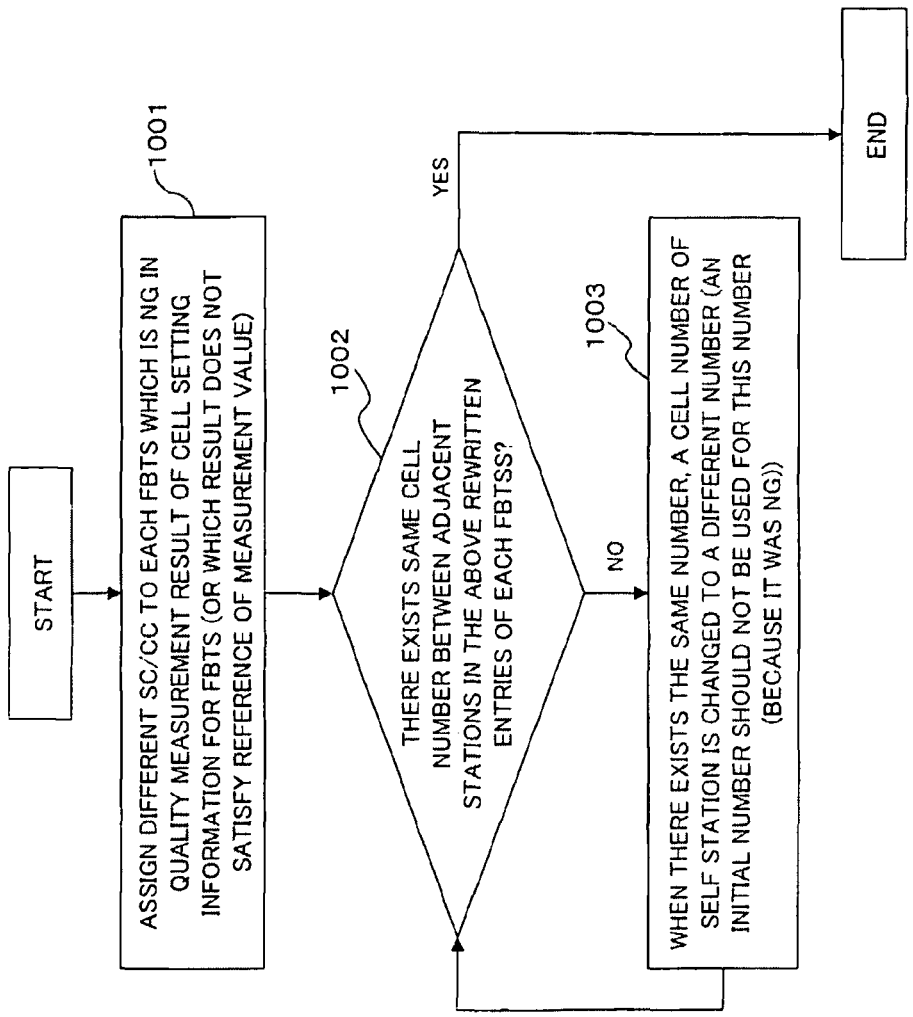
FIG. 13 is a flow chart explaining the cell setting modification processing in the FBTS controller illustrated in FIGS. 1 and 2.

At that time, the cell arrangement information determining unit 332 adaptively changes the data, for example, according to the logic as illustrated in FIG. 13 (corresponding to the processings 924 to 930 in FIG. 15). Namely, the cell arrangement information determining unit 332 assigns the different SC and CC to the FBTS 40-$j$ which is NG in the quality measurement result (or which does not satisfy the reference of the measurement value), of the entries of the cell setting information in the FBTS cell setting information memory 342 and rewrites the same cell setting information (the processing 1001).

The cell arrangement information determining unit 332 identifies whether or not there exists the same cell number between the adjacent stations 40-$j$ in the rewritten entries of the respective FBTSs 40-$j$ (the processing 1002); when there exists no same cell number, the logic is finished (NO in the processing 1002), however, when there exists, the processing of changing the cell number of the corresponding entry to a different cell number other than the initial cell number is repeated (the processing 1003 from the YES route of the processing 1002) until the same cell number disappears (until it is judged NO in the processing 1002).

When the cell setting information of the FBTS cell setting information memory 342 does not include the information of the adjacent station, the cell arrangement information determining unit 332 may skip the above identifying processing 1002.

Figure 16:
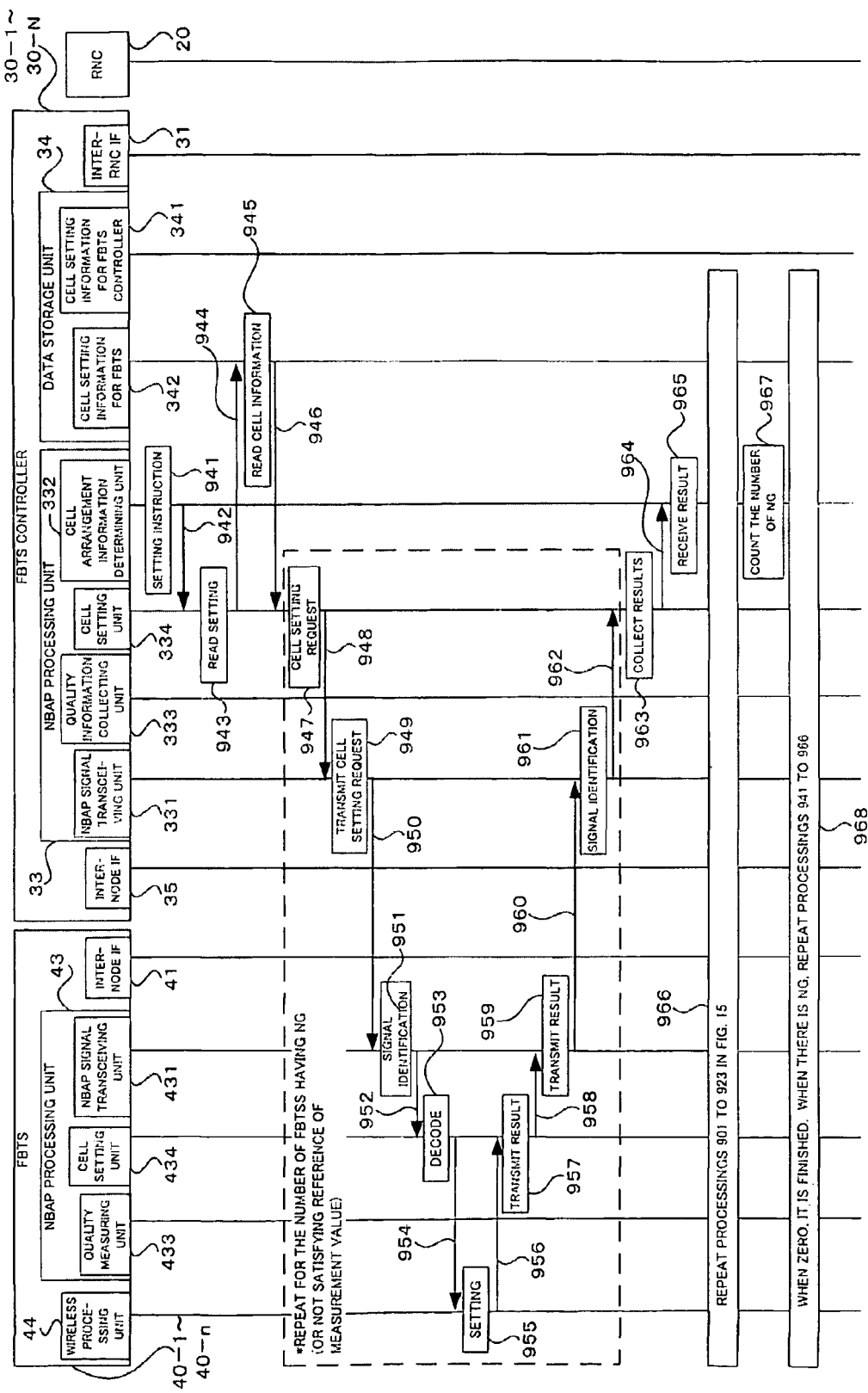
FIG. 16 is a sequence view explaining the operation (cell setting modification processing) of the femtocell system illustrated in FIGS. 1 and 2.

After modifying the above cell setting, the cell arrangement information determining unit 332 instructs the cell setting unit 334 to selectively perform the cell setting on the FBTS 40-$j$ which is NG in the quality measurement result (or which does not satisfy the reference of the measurement value) (the processings 941 and 942 in FIG. 16).

Upon receipt of the instruction, the cell setting unit 334 reads out the cell setting information (entry) of the FBTS 40-$j$ which is NG in the quality measurement result (or which does not satisfy the reference of the measurement value), from the memory 342 of the data storage unit 34 (the processings 943 to 946 in FIG. 16), and transmits the instruction of issuing the cell setting request destined for the corresponding FBTS 40-$j$ to the NBAP signal transceiving unit 331 (the processings 947 and 948 in FIG. 16).

Upon receipt of the above instruction of issuing the cell setting request, the NBAP signal transceiving unit 331 creates the NBAP signal including the cell setting information destined for the corresponding FBTS 40-$j$ and transmits it to the FBTS 40-$j$ through the inter-node IF 35 (the processings 949 and 950 in FIG. 16).

Namely, the cell arrangement information determining unit 332, the quality information collecting unit 333, and the cell setting unit 334 of this embodiment work as an assignment changing unit for modifying the cell setting (assignment of wireless resources) of the dependent FBTS 40-$j$ depending on the signal quality information such as SNR between the FBTSs 40-$j$.

Figure 14:
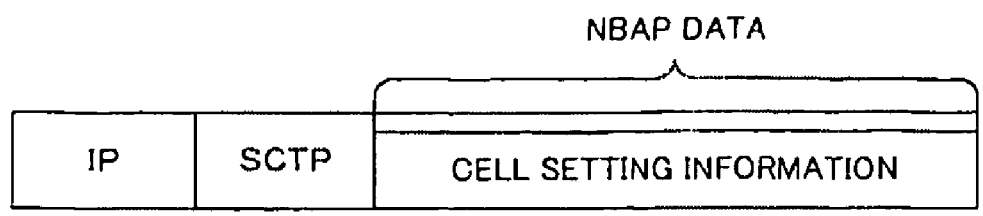
FIG. 14 is a view illustrating a format example of the cell setting information (NBAP signal) transmitted from the FBTS controller to the FBTS illustrated in FIGS. 1 and 2.

In this case, for example, the NBAP signal based on the 3GPP standard "CELL RECONFIGURATION REQUEST" can be used for the cell setting request for the FBTS. The format example is illustrated in FIG. 14. Also in this example, a header depending on the connection IF (protocol) between the FBTS controller 30-$i$ and the FBTS 40-$j$ is attached to the header portion. As one example, FIG. 14 illustrates the state of attaching the IP/SCTP header there.

The NBAP signal transceiving unit 431 of the NBAP processing unit 43 receives the cell setting request (NBAP signal) through the inter-node IF 41 of the FBTS 40-$j$, and identifies whether or not the above NBAP signal is a cell setting request for the FBTS 40-$j$ (the processing 951 in FIG. 16).

As a result, when it is the NBAP signal, the NBAP signal transceiving unit 431 transmits the NBAP signal to the cell setting unit 434 (the processing 952 in FIG. 16), otherwise, transmits the signal to the NBAP signal processing unit 432.

Upon receipt of the NBAP signal that is the cell setting request, the cell setting unit 434 decodes the received NBAP signal (the processing 953 in FIG. 16), and performs the cell setting on the wireless processing unit 44 based on the cell setting information set in the data portion (the processings 954 and 955 in FIG. 16).

When receiving the setting result (OK/NG) from the wireless processing unit 44 (the processing 956 in FIG. 16), the cell setting unit 434 transmits the setting result to the NBAP signal transceiving unit 431 (the processings 957 and 958 in FIG. 16).

The NBAP signal transceiving unit 431 creates an NBAP signal including the received setting result and transmits the signal to the FBTS controller 30-*i* through the inter-node IF 41 (the processings 959 and 960 in FIG. 16). In this case, for example, "CELL RECONFIGURATION RESPONSE (in the case of OK)" or "CELL RECONFIGURATION RESPONSE FAILURE (in the case of NG)" that is a reply to the "CELL RECONFIGURATION REQUEST" in the NBAP signal based on the 3GPP standard can be used for the NBAP signal (notification of the setting result).

The NBAP signal transceiving unit 331 of the NBAP processing unit 33 receives the NBAP signal (setting result) through the inter-node IF 35 of the FBTS controller 30-*i*, and identifies whether or not the received NBAP signal is the setting result (OK/NG) (the processing 961 in FIG. 16). As a result, when it is the setting result (OK/NG), the NBAP signal transceiving unit 331 transmits the NBAP signal to the cell setting unit 334 (the processing 962 in FIG. 16).

The reconfiguration of the cell setting information illustrated in the processings 947 to 962 is performed on all the FBTSs 40-*j* which are NG in the quality measurement result (or which do not satisfy the reference of the measurement value), and at the completion, the cell setting unit 334 collects the above setting results and transmits the total to the cell arrangement information determining unit 332 (the processings 963 and 964 in FIG. 16).

When the cell arrangement information determining unit 332 receives the totalized setting result (the processing 965 in FIG. 16), the processings 901 to 923 (quality measurement processing) illustrated in FIG. 15 is performed again (the processing 966 in FIG. 16).

As a result, when there does not exist any FBTS 40-*j* which is NG in the quality measurement result (or which does not satisfy the predetermined reference of the measurement value), the quality measurement processing is finished. When there still exists one or more FBTS 40-*j*, the processings 924 to 930, and the processings 941 to 966 are performed again (the processing 968 in FIG. 16).

Then, the cell arrangement information determining unit 332 of the FBTS controller 30-*i* confirms the number of the FBTSs 40-*j* which are NG in the quality measurement result (or which does not satisfy the predetermined reference of the measurement value) (the processing 967 in FIG. 16). When the above FBTS 40-*j* does not disappear even if a reconfiguration is performed at predetermined number of times, the FBTS controller 30-*i* (the cell arrangement information determining unit 332) transmits, for example, an operation stop to the corresponding FBTS 40-*j* or issues an alarm notification to a network operator.

As mentioned above, the femtocell system of the example can perform the cell setting on a great number of FBTSs 40-*j* at a low cost without changing the existing system such as additionally setting or altering the RNC 20. Further, the cell setting for a plurality of FBTSs 40-*j* can be performed in an easy method. Therefore, it can improve the wireless coverage indoors at a low cost.

Further, since the FBTS controller 30-*i* can autonomously perform the cell setting on the dependent FBTSs 40-*j* collectively, it is not necessary for a person in charge of maintenance to individually set the cells for the FBTS 40-*j*. Therefore, the maintenance and operation cost can be more reduced.

Further, since the FBTS controller 30-*i* can autonomously determine and perform the cell setting (cell arrangement) on the dependent FBTS 40-*j* so as not to generate the electric wave interference between the cells of the FBTSs 40-*j* and further it can adaptively change the cell setting autonomously, the conventional labor of a person in charge of maintenance measuring the electric wave interference between the cells individually and performing the cell setting on the existing BTS can be saved.

Since the FBTS 40-*j* in the femtocell system is supposed to be sized smaller than the existing BTS and to be more flexible in the number of the setting places and in space, to determine and perform the autonomous cell setting like this is very useful.

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a showing of the superiority and inferiority of the invention. Although the embodiment(s) has been described in detail, it should be understood that the various changes, substitutions, and alterations could be made hereto without departing from the spirit and scope of the invention(s).

What is claimed is:

1. A wireless communication system comprising:
a femtocell base transceiver station controller which is assigned with a plurality of wireless zones;
a plurality of femtocell base transceiver stations which communicate with the femtocell base transceiver station controller and which are operable to form a femtocell as a wireless zone; and
a radio network controller (RNC) which assigns the plurality of wireless zones to the femtocell base transceiver station controller, wherein
the femtocell base transceiver station controller is operable to perform a wireless zone setting on the plurality of femtocell base transceiver stations instead of the RNC and to request the plurality of femtocell base transceiver stations to measure signal quality information between the femtocell base transceiver stations,
each of the plurality of femtocell base transceiver stations is operable to, upon receipt of the request of measuring the signal quality information, measure a quality of a signal received from another femtocell base transceiver station and transmit the measurement result to the femtocell base transceiver station controller, and
the femtocell base transceiver station controller is operable to adaptively change the wireless zone setting according to the measurement result received from the femtocell base transceiver station.

2. The wireless communication system according to claim 1, wherein
the number of the wireless zones formed by the respective femtocell base transceiver stations is more than the number of the plurality of wireless zones, and
the wireless zone setting by the femtocell base transceiver station controller is performed by re-using any of the plurality of wireless zones.

3. The wireless communication system according to claim 2, wherein
the wireless zone setting by the femtocell base transceiver station controller is performed so that the re-used wireless zones do not overlap between the adjacent wireless zones formed by the respective femtocell base transceiver stations.

4. The wireless communication system according to claim 1, wherein
the wireless zone setting by the femtocell base transceiver station controller is adaptively changed according to signal quality information between the femtocell base transceiver stations.

5. The wireless communication system according to claim 4, wherein
the signal quality information is received from the femtocell base transceiver station as a result that the femtocell base transceiver station controller requests the femtocell base transceiver station to measure the signal quality information.

6. The wireless communication system according to claim 5, wherein
upon receipt of the request of measuring the signal quality information,
the femtocell base transceiver station measures the quality of a signal received from another femtocell base transceiver station and transmits the measurement result to the femtocell base transceiver station controller.

7. The wireless communication system according to claim 6, wherein
the measurement is performed in a state where a signal receiving sensibility of the self station is raised, or in a state where a transmitting electric power of another femtocell base transceiver station is raised.

8. The wireless communication system according to claim 1, wherein
the femtocell base transceiver station controller is assigned with the plurality of wireless zones from the RNC or a superordinate function.

9. A method of performing a wireless zone setting in a wireless communication system having a plurality of femtocell base transceiver stations operable to form a femtocell as a wireless zone, a femtocell base transceiver station controller communicating with the respective femtocell base transceiver stations, and a radio network controller (RNC) which communicates with the femtocell base transceiver station controller, the method comprising:
assigning, by the RNC, the plurality of wireless zones to the femtocell base transceiver station controller;
performing, by the femtocell base transceiver station controller, the wireless zone setting on the plurality of femtocell base transceiver stations instead of the RNC;
requesting, by the femtocell base transceiver station controller, the plurality of femtocell base transceiver stations to measure signal quality information between the femtocell base transceiver stations;
upon receipt of the request of measuring the signal quality information, measuring, by each of the plurality of femtocell base transceiver stations, a quality of a signal received from another femtocell base transceiver station and transmitting the measurement result to the femtocell base transceiver station controller; and
changing, by the femtocell base transceiver station controller, adaptively the wireless zone setting according to the measurement result received from the femtocell base transceiver station.

10. A femtocell base transceiver station controller communicating with a plurality of femtocell base transceiver stations, the femtocell base transceiver station controller comprising:
a receiver that receives assignment information of a plurality of wireless zones from a radio network controller (RNC); and
an assignment controller that performs a wireless zone setting on the plurality of femtocell base transceiver stations instead of the RNC based on the received assignment information, requests the plurality of femtocell base transceiver stations to measure signal quality information between the femtocell base transceiver stations, and adaptively changes the wireless zone setting according to a measurement result received from the femtocell base transceiver station in response to the request, the measurement result is a result of measuring, by the femtocell base transceiver station, a quality of a signal received from another femtocell base transceiver station.

11. The femtocell base transceiver station controller according to claim 10, wherein
the number of the wireless zones formed by the respective femtocell base transceiver stations is more than the number of the plurality of wireless zones, and
the assignment controller performs the wireless zone setting by re-using any of the plurality of wireless zones.

12. The femtocell base transceiver station controller according to claim 10, wherein
the assignment controller performs the wireless zone setting so that the re-used wireless zones do not overlap between the adjacent wireless zones formed by the respective femtocell base transceiver stations.

13. The femtocell base transceiver station controller according to claim 10, wherein
the assignment controller further comprises an assignment changing unit operable to change the wireless zone setting depending on the signal quality information between the femtocell base transceiver stations.

14. The femtocell base transceiver station controller according to claim 13, wherein
the assignment controller further comprises
a quality measurement requesting unit which requests the femtocell base transceiver station to measure the signal quality information, and
a quality information receiving unit which receives the measurement result, in response to the request, from the femtocell base transceiver station and gives the received result to the assignment changing unit.

* * * * *